United States Patent [19]

Furuya

[11] 3,860,870

[45] Jan. 14, 1975

[54] MICROWAVE RELAY SYSTEM HAVING AUXILIARY SIGNAL TRANSMISSION ARRANGEMENT

[75] Inventor: Tadashi Furuya, Tokyo, Japan

[73] Assignee: Nippon Electric Company, Limited, Tokyo, Japan

[22] Filed: Jan. 9, 1974

[21] Appl. No.: 432,113

[30] Foreign Application Priority Data

Jan. 12, 1973 Japan .............................. 48-6723

[52] U.S. Cl. .................... 325/3, 179/15 BM, 325/9, 325/61

[51] Int. Cl. ............................................ H04b 7/16

[58] Field of Search .......................... 325/1, 3, 9–11, 325/13, 61, 7; 179/15 BD, 15 FE, 15 AD, 15 BM

[56] References Cited

UNITED STATES PATENTS

| | | | |
|---|---|---|---|
| 2,378,298 | 6/1945 | Hilferty | 179/15 BM |
| 2,514,425 | 7/1950 | Thompson | 325/3 |
| 3,389,337 | 6/1968 | Hubbard et al. | 325/7 |

OTHER PUBLICATIONS

Bennett et al., Data Transmission, McGraw-Hill, 1965, pp. 257, 258.

*Primary Examiner*—Benedict V. Safourek
*Assistant Examiner*—George H. Libman
*Attorney, Agent, or Firm*—Sughrue, Rothwell, Mion, Zinn & Macpeak

[57] ABSTRACT

A microwave heterodyne relay system transmitting a main carrier, angle-modulated wave in combination with an auxiliary signal transmission system is disclosed. The auxiliary signal transmission is accomplished by a subcarrier wave frequency-modulated with the auxiliary signal. The frequency-modulated subcarrier wave is then used to amplitude modulate the main carrier. The receiver of the relay system is branched into two paths. In the first path, the envelope of the main carrier is detected and then frequency demodulated to obtain the auxiliary signal. In the second path, the amplitude modulation of the main carrier is suppressed by an amplitude limiter before the main carrier is amplitude modulated by the locally generated frequency-modulated subcarrier wave prior to retransmission.

4 Claims, 1 Drawing Figure

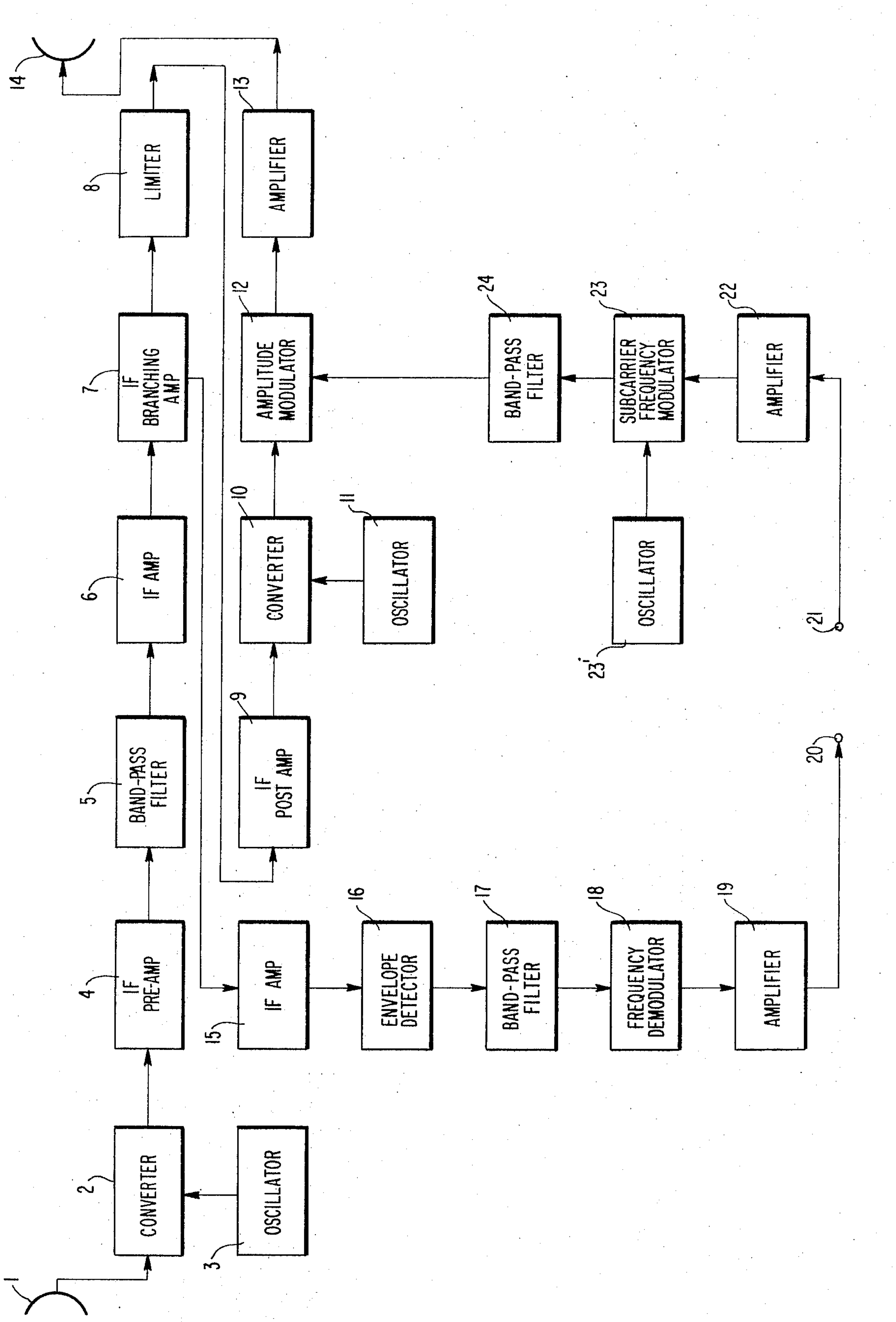
CONVERTER
OSCILLATOR
IF PRE-AMP
BAND-PASS FILTER
IF AMP
IF BRANCHING AMP
LIMITER
IF AMP
ENVELOPE DETECTOR
BAND-PASS FILTER
FREQUENCY DEMODULATOR
AMPLIFIER
IF POST AMP
CONVERTER
OSCILLATOR
AMPLITUDE MODULATOR
AMPLIFIER
BAND-PASS FILTER
SUBCARRIER FREQUENCY MODULATOR
AMPLIFIER
OSCILLATOR
1
2
3
4
5
6
7
8
9
10
11
12
13
14
15
16
17
18
19
20
21
22
23
23'
24

MICROWAVE RELAY SYSTEM HAVING AUXILIARY SIGNAL TRANSMISSION ARRANGEMENT

This invention relates to a microwave heterodyne relay system accompanied with an auxiliary signal transmission channel for the transmitting of various auxiliary information such as alarm, monitoring, control, and order-wire signal.

DESCRIPTION OF THE PRIOR ART

In such a microwave relay system having a plurality of relay stations, each of the stations must be equipped with means for transmitting and receiving from another station such auxiliary signals for the mentioned and other purposes.

It has been the practice to provide the auxiliary signal transmission channels by the use of (1) an independent cable or circuit exculsively for the auxiliary signal; (2) a frequency band lying below the lower limit of the frequency band assigned to the frequency division muliplex information signals; or (3) the single-side-band or double-side-band frequency modulation at a frequency band lying above the upper limit of the frequency band allocated for the main transmission signal.

These conventional systems have various disadvantages as follows: The system (1) is uneconomical in that an independent transmission circuit is needed separately from the main transmission line; the system (2) may be economical as compared with the system (1) in that the auxiliary signals can be transmitted over the main transmission line, but it is not applicable to a system for the transmission of a television video signal in which the lower limit in the frequency band of the main video signal is extremely low. The system (3) may find application also in a relay system for transmitting the television video signals, but there arises not only the extreme difficulty of maintaining the high frequency stability (of the order of ±1 Hz) for a carrier wave of the single-side-band signal to be added at each relay station, but also the necessity for the control of the phase of the double-side-band carrier signals in strict coincidence between relay stations in cases where the double-side-band carrier signals are added at each relay station. A further disadvantage is that the frequency response at a region above the upper limit of the base-band region will easily be deteriorated during a multi-hop relaying process and the SSB or DSB signals using such unreliable frequency band, therefore, give rise to the level variation on the signal received in the other station. A still further disadvantage of this system is that the frequency modulation noise becomes predominant in this frequency band and, therefore, the signal-to-noise ratio tends to be deteriorated.

SUMMARY OF THE INVENTION

The object of the present invention is therefore to provide a microwave heterodyne relay system having an auxiliary signal transmission channel capable of maintainning a high fidelity for the transmission signals without involving the difficulties inherent to the aforementioned conventional systems.

According to the present invention, the microwave heterodyne relay system transmitting a main carrier wave angle-modulated with the main base-band signal is constructed in combination with an auxiliary signal transmission system including a transmitting means for the auxiliary signal consisting of means for generating a subcarrier wave so selected as to lie above the highest frequency component of the main base-band signal. Means are provided for frequency-modulating the subcarrier wave with the auxiliary signal and for amplitude-modulating the main carrier wave with the frequency-modulated subcarrier signal. Receiving means for the auxiliary signal consisting of branching means receives the main carrier wave amplitude-modulated with the subcarrier wave and branches its output signal into two transmission paths. One branched-out component of the main carrier signal is envelope-detected and the subcarrier signal frequency-modulated with the auxiliary signal, is extracted. The extracted subcarrier signal is frequency-discriminated so as to demodulate the auxiliary signal. Amplitude limiting means consisting of means for receiving the other of the branched-out components of the main carrier signal suppresses the amplitude variation of the received main carrier wave being amplitude-modulated. The amplitude-limited main carrier wave is then applied to the input of the amplitude-modulating means.

BRIEF DESCRIPTION OF THE DRAWINGS

Now an example of an auxiliary signal transmission system of the present invention as applied to the transmitting and receiving equipment of the relay station will be described referring to the attached drawing in which the sole FIGURE is a block diagram.

DESCRIPTION OF THE PREFERRED EMBODIMENT

In the drawing, a microwave main carrier wave received by a receiving antenna 1 is mixed at a receiving frequency converter 2 with a local oscillation supplied from a local oscillator 3 for the frequency conversion into an intermediate-frequency signal at 70 MHz, for example. The intermediate-frequency (i.f.) signal is fed to a gain-controlled main i-f amplifier 6 via an i-f pre-amplifier 4 and an i-f band-pass filter 5 arranged in succession. The main carrier wave converted into the i-f signal is amplified to an approximately constant output level by the amplifier 6 and is branched into two parts by an i-f branching amplifier 7. One of the two branched parts is fed to a transmitting frequency converter 10 via an amplitude limiter 8 and an i-f post-amplifier 9. To the transmitting frequency converter 10 is also fed a local oscillation from a transmitting local oscillator 11, whereby the i-f signal from the amplifier 9 is converted to a microwave main carrier wave to be transmitted. The main carrier wave is transmitted from a transmitting antenna 14 via an amplitude modulator 12 as described hereafter and a transmitting frequency band amplifier 13.

An auxiliary signal to be transmitted to the relay station (or the receiving terminal station) immediately subsequent to this intermediate relay station is impressed on a terminal 21. Then, the auxiliary signal is amplified by an amplifier 22 to a predetermined level and impressed on a subcarrier frequency modulator 23 provided with a subcarrier frequency oscillator 23'as a modulating input signal to cause the subcarrier wave to be frequency-modulated. The frequency-modulated subcarrier wave therefrom has its harmonic and unwanted components such as noise removed by a band-pass filter 24 and then applied to the amplitude modulator 12 in order to amplitude-modulate the main carrier wave derived from the transmitting frequency converter 10. Thus, the frequency-modulated carrier wave is amplitude-modulated by the subcarrier wave frequency-modulated with the input signal at the terminal 21 and transmitted from the antenna 14.

On the other hand, the main carrier wave frequency-modulated with the main baseband signal and amplitude-modulated with the subcarrier signal in the manner mentioned above is transmitted from the transmitting antenna of the preceding relay station (or the transmitting terminal station) and is received by the antenna 1 of this relay station. The main carrier signal received is branched into two parts by the i-f branching amplifier 7. One of the two branched parts is fed to the amplitude limiter 8 as explained above and the amplitude variation of the amplitude-modulated main carrier wave is thereby suppressed. Thus, the amplitude-limited main carrier wave is applied to the input of the amplitude modulator 12 for amplitude modulation in this station.

The other part of the i-f main carrier wave branched at the branching amplifier 7 is amplified by an i-f amplifier 15 and fed to an envelope detector 16. From the detector 16 is extracted a subcarrier wave carried by amplitude-modulating the main carrier wave from the preceding station. The undesirable wave components in the subcarrier wave are suppressed by a subcarrier band-pass filter 17 before the signal is fed to a frequency demodulator 18. Thus, an auxiliary signal transmitted by frequency-modulating the subcarrier wave at the preceding station is demodulated by the demodulator 18. The demodulated ouput is amplified to a predetermined level by a baseband amplifier 19, and the auxiliary signal is available at an output terminal 20.

Incidentally, when viewed at the main carrier wave fed to the amplitude modulator 12 from the transmitting frequency converter 10, a suppression of the order of 30dB or more is achieved by the amplitude limiter 8 of the amplitude modulation component. Amplitude and angle modulation are essentially in quadrature relationship, and there should be no interference between them theoretically. In practice, however, the quadrature relationship may not at times be maintained. Since, however, the auxiliary signal is intended to frequency-modulate the subcarrier wave allocated apart by 7 to 10 MHz in a region outside the uppermost end of the frequency band of the main baseband signal, the transmission of the main transmission signal has no interference with the transmission of the auxiliary signal. As a result, the main baseband signal received at the receiving terminal station is capable of providing a signal-to-noise ratio of 50 dB or more. The subcarrier frequency oscillator 23' is preferably provided with an automatic frequency control (AFC) circuit. Altermotively, if both the transmitting frequency converter 10 and the transmitting frequency band amplifier 13 are designed to have good linearity with respect to the variation in amplitude of the main carrier, the amplitude modulation of the main carrier wave may be carried out in the intermediate frequency band. In such a case, the amplitude modulation circuit 12 must be inserted between the i-f post-amplifier 9 and the transmitting frequency converter 10. Further, the response time of the automatic gain control circuit associated with the main i-f amplifier 6 should be sufficiently slower than the repetition rate of the subcarrier wave and the amplitude modulation component of the main carrier wave due to the subcarrier wave should be designed so as not to be suppressed.

Since the main transmission wave in this system is relayed in the heterodyne relay fashion as mentioned previously, the high-quality transmission with minimized distortion and optimized S/N ratio is carried out without repeating the demodulation and modulation process at each relay station. As regards the transmission of the auxiliary signal, substantial economization can be achieved in that no independent channel line or single-sideband frequency modulation system, etc. is provided. A further advantage of this invention is the so-called FM gain, because the subcarrier wave is frequency-modulated with the auxiliary signal. Thus, it is made possible to transmit the auxiliary signal with high signal-to-noise ratio. Also, there is no objection to the use of a subcarrier wave of different frequency for each auxiliary signal at every relay station.

What is claimed is:

1. A microwave heterodyne relay system having a plurality of relay stations each having a transmitting and receiving means for relaying a main carrier wave angle-modulated with a main base band signal, said transmitting and receiving means in at least one relay station including an auxiliary signal transmission means comprising:

transmitting means for said auxiliary signal consisting of:

means for generating a subcarrier wave so selected as to be disposed outside the uppermost component of said base band, means for frequency-modulating said subcarrier wave with an auxiliary signal, and means for amplitude-modulating said main carrier wave with said frequency-modulated subcarrier wave;

receiving means for said auxiliary signal consisting of:

branching means for receiving said main carrier wave amplitude-modulated with said subcarrier wave and for dividing its output signal into two paths, means for envelope-detecting one of the branched components of said main carrier wave and for extracting said subcarrier wave frequency-modulated with said auxiliary signal, and means for frequency-discriminating said extracted subcarrier wave so as to demodulate said auxiliary signal; and amplitude limiting means consisting of:

means for receiving the other of said branched components of the main carrier wave and for suppressing amplitude variation of said received amplitude-modulated main carrier wave, and means for applying said amplitude-limited main carrier wave to the input of said amplitude-modulating means.

2. In the microwave heterodyne relay system as recited in claim 1 wherein said transmitting and receiving means includes a receiving antenna for receiving said main carrier wave, first convertor means connected to said receiving antenna for converting said main carrier wave to an intermediate frequency signal, intermediate amplifier means for amplifying said intermediate frequency signal, second convertor means receiving the amplified intermediate frequency signal and converting it to a transmitting frequency signal, amplifier means for amplifying said transmitting frequency signal, and a transmitting antenna for radiating the amplified transmitting frequency signal, said branching means being part of said intermediate amplifier means, and said amplitude limiting means being connected between said intermediate amplifier means and said second convertor means.

3. In the microwave heterodyne relay system as recited in claim 2, said means for amplitude-modulating being connected between said second convertor means and said amplifier means.

4. In the microwave heterodyne relay system as recited in claim 2, said means for amplitude-modulating being connected between said amplitude limiting means and said second convertor means.

* * * * *